United States Patent Office 3,339,929
Patented Sept. 5, 1967

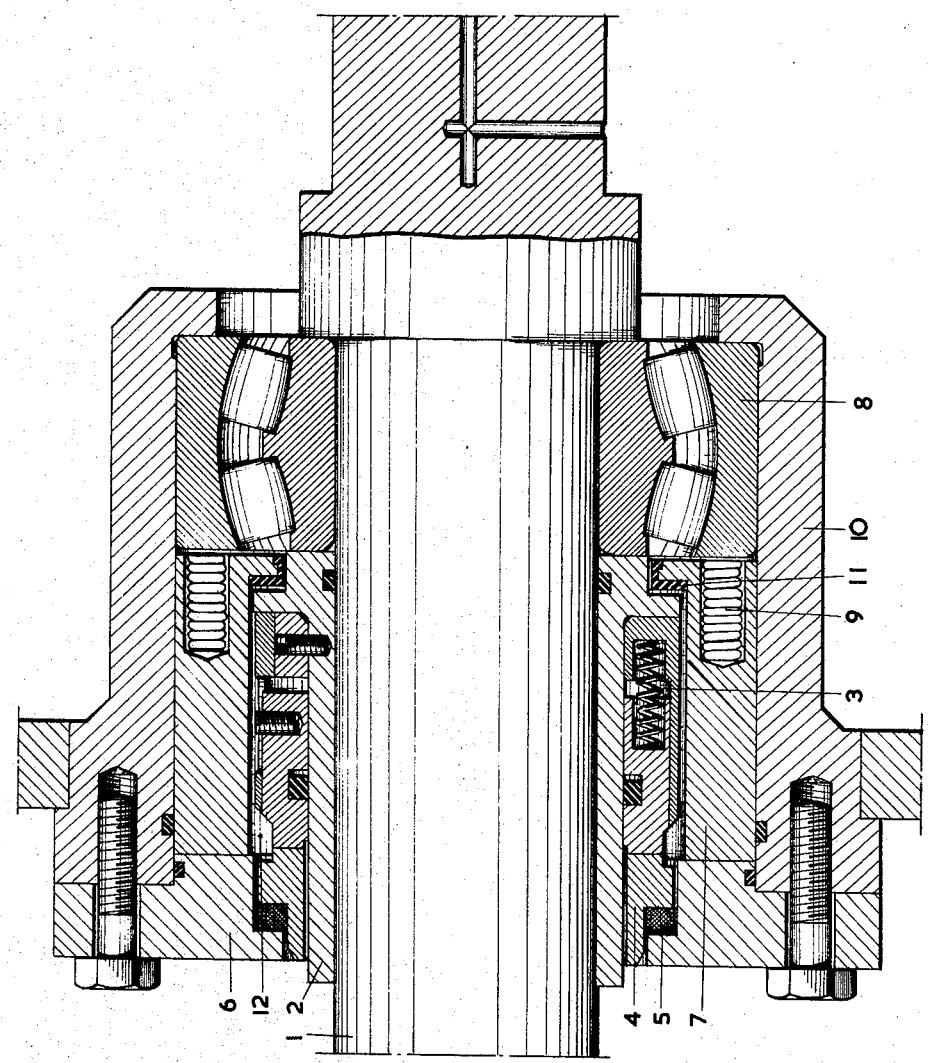

3,339,929
REPLACEABLE SHAFT SEAL
Willem Johannes Stam, Vlijmen, Netherlands, assignor to Grasso's Koninklijke Machinefabrieken N.V.'s, Hertogenbosch, Netherlands, a corporation under Dutch law
Filed Dec. 1, 1964, Ser. No. 415,144
Claims priority, application Netherlands, Dec. 5, 1963, 301,402
1 Claim. (Cl. 277—9)

ABSTRACT OF THE DISCLOSURE

A shaft seal with replaceable parts including additional sealing elements in series with the conventional sealing elements, said additional sealing elements being kept out of engagement during normal operation of the conventional sealing elements.

---

The invention relates to a shaft seal with replaceable parts.

With the hitherto usual shaft seals for rotary shafts with replaceable parts it is necessary in connection with the substances for instance liquids present in the machine to take special measures when one or more parts are removed. Thus, when parts of the shaft seal, such as the sealing elements of a pump or a compressor, for instance, have to be replaced, first one or more valves must be closed and then the pump must be drained or the compressor evacuated. After replacement of the sealing elements the pump must be vented and refilled, while a compressor must be evacuated before being filled.

It is the object of the invention to provide for a shaft seal in which the above-mentioned disadvantages are avoided and any damaged parts can be replaced in a simple way without the substances present in the machine or tanks first having to be drained off or being lost, while any evacuation and venting can be omitted.

The shaft seal according to the invention is characterized by additional sealing elements in series with the usual sealing elements, the former being kept out of engagement with each other during normal operation by the usual sealing elements against a force acting on the additional elements in the closing direction, and in case of removal of the usual sealing elements taking over the sealing function.

The invention will now be elucidated more fully by reference to the drawing, which illustrates an axial section of an embodiment of a shaft seal according to the invention.

The figure shows a housing 10 for the shaft seal, through which passes a shaft 1 with a collard sleeve 2, which is provided with an O-ring. The sleeve 2 is mounted with a close fit so as to rotate with the shaft. Mounted round this sleeve, on the left in the drawing, is a usual shaft seal, consisting of the parts 3, 4, and 5. This shaft seal is forced under spring action against a collar of the sleeve 2 and is held in place by the lid 6.

The additional sealing elements according to the invention are formed by a sleeve 7, a packing 11, and a collar on the sleeve 2. The packing 11 is mounted on an internal collar of the sleeve 7. This sleeve 7 is forced against the lid 6 by the spring tension of the springs 9. The springs 9 rest against the outer ring of the bearings 8. During operation the packing 11 is kept clear of the collard sleeve 2 and the bearings 8. The collard sleeve 7 is mounted in the bearing housing 10 with a sliding fit, while between the sleeve 7 and the housing 10 is fitted an O-ring against leakage.

When the shaft seal leaks or has to be removed for inspection, for instance, the bolts of the lid 6 are unscrewed, in consequence of which the latter is forced outwards by the spring pressure of the springs 9 and the springs in the part 3 of the usual shaft seal until the packing 11 rests against the collar of the sleeve 2. The connection of the interior of the machine (on the right in the drawing) is now shut off from the circular chamber 12 and from the atmosphere. After the lid 6 has been removed, the shaft seals 3, 4, and 5 can now be replaced or inspected, as required.

When the seal is to be reassembled, the parts 3, 4, and 5 of the usual shaft seal are put in place again, after which the lid 6 can be fastened by means of the bolts. In consequence, the connection between the packing 11 and the collar of the sleeve 2 is automatically broken again, while the sleeve 7 with the packing 11 remains clear of the bearings 8. The sealing of the machine has thus been taken over again by the usual shaft seals 3, 4, and 5.

What I claim is:

A shaft seal with replaceable parts comprising a main seal and an auxiliary seal in series with the main seal, in which the main seal comprises a member on the inside of the lid of a shaft seal housing, around the shaft opening of the lid, and a radial sealing surface on a first sleeve which forms a tight and axially slidable joint with the shaft, which surface is pressed under spring action against said member, and in which the auxiliary seal comprises a fixed outwardly extending radial collar on the shaft, a packing mounted on an inwardly extending radial collar of a second sleeve, and normally out of engagement with said radial collar on the shaft, said second sleeve forming a tight and axially slidable seal joint with the housing and the lid and slidably surrounding the first sleeve and being pressed under spring action against the inside of the said lid, the arrangement being such, that when the lid is removed to replace or inspect the main seal, the packing on the internal collar of the second sleeve will be pressed on to the inwardly extending collar on the shaft by the spring action working on the second sleeve before the sealing function of the main seal and of the seal joint between the lid and the housing is lost.

References Cited

UNITED STATES PATENTS

| | | | |
|---|---|---|---|
| 2,945,711 | 7/1960 | Dykman | 277—9 XR |
| 3,096,985 | 7/1963 | Biheller | 277—9 |
| 3,166,330 | 1/1965 | Boutros | 277—9 XR |

SAMUEL ROTHBERG, *Primary Examiner.*